Patented Oct. 12, 1937

2,095,767

UNITED STATES PATENT OFFICE 2,095,767

PROCESS OF TREATING SOUR PRODUCTS

Alfred O. Shaw, Malta, Idaho, assignor to Milk Processes, Inc., Philadelphia, Pa.

No Drawing. Application September 27, 1935, Serial No. 42,465

3 Claims. (Cl. 99—62)

This invention relates to the treatment of sour milk products and is particularly concerned with the production of milk products of low acidity from high acidity or sour milk products. It has as its object the production from milk products which are of such high degree of acidity as to render them unfit for conversion into sweet milk products by ordinary means, sweet milk products which are undistinguishable from products obtained from ordinary sweet milk.

In the practice of the invention, a sour milk product, such as sour milk or cream, is neutralized to an acidity of .10 to .22% by means of a suitable neutralizer, and the resultant product is thereafter heated to a temperature of 145° to 180° F. before it is subjected to treatment adapted to effect removal of the major portion of the serum content of the product and of the products of neutralization. The removal of these undesired constituents is attained by centrifugation of the neutralized product. In this connection, the neutralized product is first treated with a neutral salt before the separating step. Thereafter, however, the product may be subjected to centrifugal force in a centrifugal separator to produce a cream of unusually high butter fat content, such as that described in Herman D. Wendt patent Reissue No. 19,123, this cream preferably comprising between 65 and 85% butter fat.

The practice of a neutralizing and centrifuging process under conditions adapted to produce a super cream as described in the above identified Wendt reissue patent is attended with a certain amount of difficulty due to the neutralizer flavor which is imparted to the product. In order to produce a super cream with keeping qualities it has heretofore been necessary to reduce the acidity of the sour milk product to .05% in order to insure the desired degree of fluidity of the curd to render its continuous flow through the centrifugal rotor possible with the result that the removal of the last trace of neutralizer flavor was rendered almost impossible. Previously high acid cream has been neutralized to a relatively low point by the practice of double neutralization, i. e. the neutralization in two successive instalments, using either the same neutralizer or a different neutralizer for each step in acid reduction, and the flavor of excessive neutralizer has been removed from the product by employing a series of water washing and separating operations. Such operations have been very objectionable since they complicate the process of neutralization and tend to invite confusion and error, thus jeopardizing the accuracy of the final results.

It is, therefore, an object of this invention to produce a milk product of fine texture, long keeping quality which prevents the development of rancidity after storage, and which possesses all of the good qualities of the products of the former processes without the attendant disadvantages arising from relatively low neutralization.

I have discovered that these qualities may be obtained and the above disadvantages may be obviated by first heating the sour milk product to approximately 80° F. before determining the acidity of the same, and after the acidity of the product has been determined adding a sufficient quantity of neutralizing agent to reduce the acidity to within the range of .10 to .22%. For this purpose I may use any of the well known neutralizers, but I prefer to employ a soda neutralizer because such neutralizers are completely soluble in water. Such neutralizers may be made up in complete solution of definite strength, thus facilitating their handling and the accuracy of their results, and their action on the acid in the milk product is far more speedy than that of lime neutralizers. Furthermore, soda neutralizers tend to soften the casein and to preserve its colloidal character. These neutralizers do not surrender any portion of their neutralizing strength to the casein, and, therefore, the neutralization can be controlled more accurately because their neutralizing value in a sour milk product is approximately as calculated by chemical equation. Among the most satisfactory soda neutralizers are sodium bicarbonate, ($NaHCO_3$), and sodium carbonate, ($Na_2CO_3$). Sodium sesquicarbonates and mixed soda compounds may also be used with successful results.

After the acidity of the milk product has been reduced to within the range between .10 and .22%, I add a small quantity of a neutral salt such as sodium citrate. Such salt may be added in the amount of approximately .15 to .2% by weight to stabilize the emulsion. The sodium citrate also has the peculiar property of maintaining the resulting product at a standard acidity.

One of the critical discoveries which I have made relates to the temperature range to which the product is heated before centrifugation. Heretofore a heating step was employed for the purpose of rendering the butter fat sufficiently liquid to permit easy separation. I have discovered that this heating step is of importance in determining the effect of the neutralizer, the final flavor of the product, and finally its stability at a given standard of neutralization. When the product is heated to a temperature substantially below 145° F. there is a material retention of neutralizer flavor upon subsequent centrifugation. Furthermore, when a separation temperature of about 160° F. is employed the enzyme lipase is destroyed, thus prolonging the keeping qualities of the finished product.

Subsequent to the heating step and while still hot enough to maintain the butter fat in liquid state, the neutralized product is subjected to centrifugal force in a centrifugal separator to effect the removal of the major portion of the serum and curd and the products of neutralization.

As a modification of the process described above, it is possible to subject the neutralized product to two separating operations, between which operations may be added a water washing step to remove the last traces of neutralizer flavor. Steam or air may also be forced through the product to remove foreign odors which may still be present. These modifications are ordinarily not necessary but they may be used in cases where the sour milk product is in poor condition or where a superfine final product is required.

It is evident that the process may be employed to produce simple cream and it is also clear that further steps may be added to the process and that the steps above described may be varied without departing from the spirit of the invention, and I do not propose to be limited in the practice of my invention except as I may be limited by the scope of the subjoined claims.

What I claim is:

1. In the manufacture of creamery products from high acid content sour milk products containing butter fat in the dispersed phase, the steps comprising standardizing the acidity of the sour milk product by adding an alkali to said sour milk product to reduce the acidity thereof to between .10 and .22%, heating the product to a temperature above 145° F., adding thereto a small proportion of sodium citrate, and thereafter subjecting the standardized product to a centrifugal separating operation to obtain its butter fat content in a condition of over 65% concentration.

2. In the manufacture of creamery products from high acid content sour milk products containing butter fat in the dispersed phase, the steps comprising standardizing the acidity of the sour milk product by adding an alkali to said sour milk product to reduce the acidity thereof to between .10 and .22%, adding to the standardized product so produced a small proportion of sodium citrate, and thereafter subjecting the standardized product to a centrifugal separating operation to obtain its butter fat content in a condition of over 65% concentration.

3. In the manufacture of creamery products from high acid content sour milk products containing butter fat in the dispersed phase, the steps comprising standardizing the acidity of the sour milk product by adding an alkali to said sour milk product to reduce the acidity thereof to between .10 and .22%, adding to the standardized product so produced between .15 and .2% of sodium citrate, and thereafter subjecting the standardized product to a centrifugal separating operation to obtain its butter fat content in a condition of over 65% concentration.

ALFRED O. SHAW.